United States Patent Office 3,346,270
Patented Oct. 10, 1967

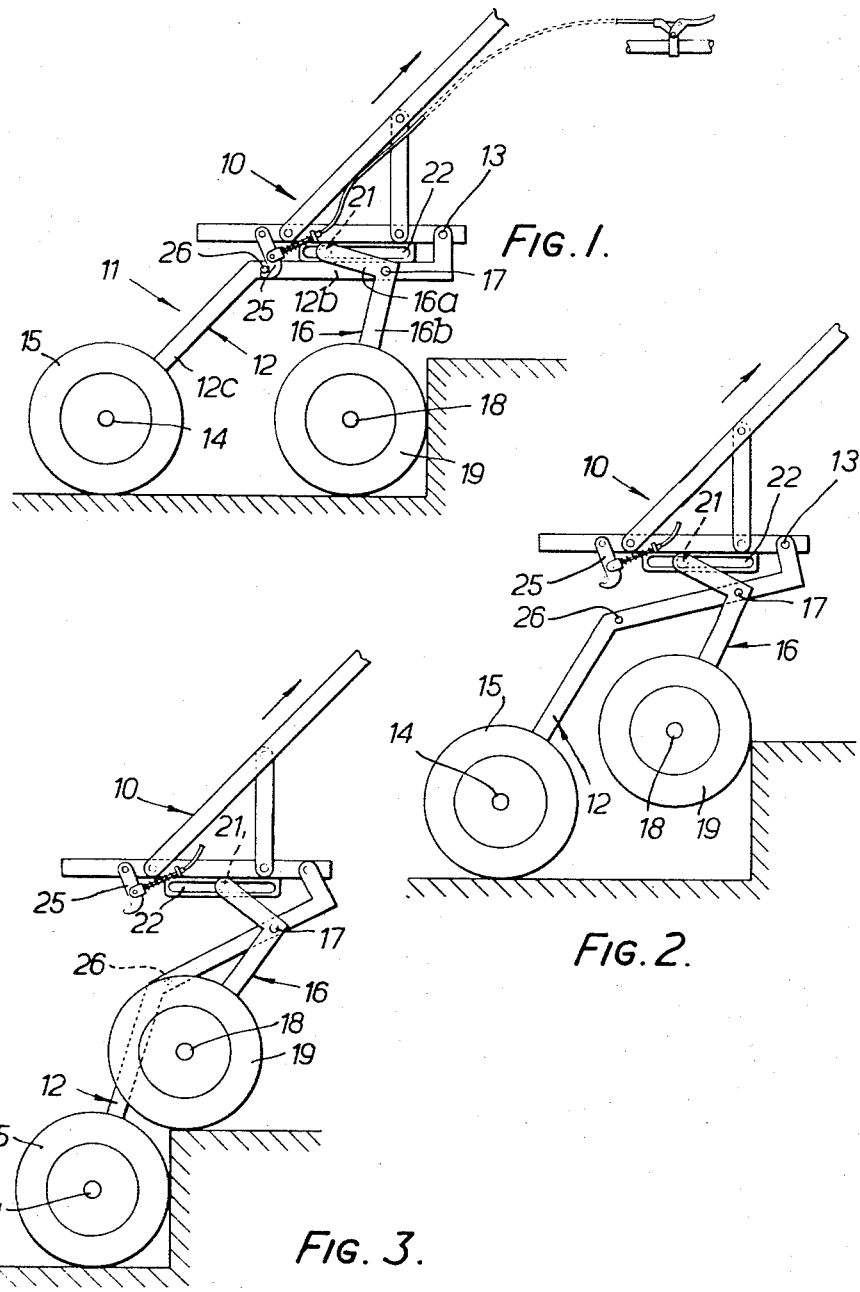

3,346,270
STEP CLIMBING WHEEL CARRIAGE
Jan Adamczyk, Hucknall, England, assignor to Firth Cleveland Limited, London, England, a British company
Filed Sept. 13, 1965, Ser. No. 486,887
Claims priority, application Great Britain, Sept. 17, 1964, 37,952/64
4 Claims. (Cl. 280—5.28)

ABSTRACT OF THE DISCLOSURE

A wheeled carriage having an undercarriage which permits the carriage to be pulled up or pushed down steps while maintaining the carriage substantially level and the wheels in contact with the ground, the forward and rearward wheels being mounted on legs movably connected to the carriage to permit relative upward and downward movement between the forward and rearward wheels.

This invention relates to wheeled carriages, and in particular to a wheeled carriage having an undercarriage which permits the carriage to be drawn over rough ground or pulled up and pushed down steps or curbs while maintaining the carriage substantially level.

According to the present invention there is provided a wheeled carriage comprising a carriage body and an undercarriage, the latter including a forward wheel supported by a first leg, said first leg having a connection with the carriage body, a rearward wheel supported by a second leg which intersects the first leg and has a separate connection with the carriage body, a connection being provided between the first and second legs at their intersection, the arrangement of the legs and said connections being such that when the carriage is pulled rearwardly against a rising step or like obstacle so that said rear wheel engages the obstacle, lifting of the carriage to draw said rear wheel over the obstacle, while maintaining the carriage level in the fore and aft direction, permits the forward wheel to drop relative to the carriage body and the rear wheel to swing towards the forward wheel so that both said wheels maintain load-carrying engagement with the ground.

The present invention also provides a wheeled carriage comprising a carriage body and an undercarriage, the latter including a first leg supporting a forward wheel and having a connection with the carriage body, a second leg supporting a rearward wheel and having a connection with the carriage body forward of the first said connection, said two legs intersecting and having a connection at their intersection, two of the connections permitting only pivotal movement, and the other connection permitting sliding movement, between the parts connected thereby, the arrangement being such that if the carriage body is raised, but maintained level in the fore and aft direction as the carriage is pulled rearwardly over an upstanding obstacle, the said connections permit the rear wheel which engages the obstacle to swing towards the corresponding forward wheel, and said forward wheel to drop relative to the carriage body sufficiently to maintain both said wheels in load-carrying engagement with the ground.

The present invention further provides a wheeled carriage comprising a carriage body and, on each of two opposite sides thereof, a first leg supporting a forward wheel and extending upwardly and rearwardly to a pivot connection with the carriage body, a second leg supporting a rearward wheel and extending upwardly and rearwardly to an intersection with the first leg, a pivot connection therebetween being formed at said intersection, said second leg extending upwardly and forwardly from said intersection to a horizontal sliding connection with the carriage body, the arrangement being such that if the carriage is drawn rearwardly and upwardly over an obstacle, the carriage can be maintained level in the fore and aft direction without removing either of said wheels from load-carrying engagement with the ground.

Reference is made throughout to the wheels being in engagement with the "ground," and it is to be assumed that this word includes any surface over which the carriage is moved.

One form of wheeled carriage in accordance with the invention will now be particularly described with reference to the accompanying drawings in which:

FIGS. 1 to 3 are side elevations of the carriage, showing the position adopted by the wheels and undercarriage when the wheels are on level ground in FIG. 1, when the rear wheels are riding over an obstacle in FIG. 2, and when the front wheels follow the rear wheels in riding over an obstacle in FIG. 3.

The carriage now to be described is a child's pushchair which comprises a carriage member 10 in the form of a seat with a handle attached thereto, and an undercarriage 11 which comprises four wheels connected to the seat by four legs, only two of the wheels and two of the legs being visible in the drawings.

The pair of legs on each side of the undercarriage are substantially identical and comprise a first leg 12 which is connected by a first pivot 13 at its upper end to a rearward point on the seat, a first portion 12a of the leg extending downwardly from the pivot, a second portion 12b, extending forwardly from the first portion, being substantially horizontal and parallel spaced below the seat and having, at its forward end, a third portion 12c extending forwardly and downwardly and terminating in a bearing 14 for the front wheel 15. The second leg 16 is of L-shape and comprises a first portion 16b extending downwardly and in a forward direction from a second pivot 17 on the horizontal part of the first leg, this portion of the leg terminating in a bearing 18 for the rear wheel 19, while the second portion 16a of the second leg extends forwardly from the second pivot normal to the first portion of the leg and terminates in a roller 21 which is arranged to roll on the horizontal underside of the seat, or in a guide 22 as shown.

In operation, when the push chair is drawn backwardly so that the rear wheel engages against a step and starts to roll up the upright face of the step, the reaction between the roller 21 and its guide formed on the underside of the seat causes the first leg 12 to pivot in a downward direction about the first pivot 13 and maintain the front wheel 15 in engagement with the ground and the seat can be held level in spite of the rear wheel 19 rolling up the step. When the rear wheel has moved on to the horizontal upper surface of the step, the front wheel rides up the upright face of the step, and the second leg 16 swings back towards its original position which is reached when the front wheel has moved on to the upper surface of the step.

In other words, as the chair rides over an obstacle, the legs and their connections with the chair and with each other constrain the front wheel to drop relative to the chair, and the rear wheel to rise relative to the front wheel, while maintaining both wheels in load-supporting engagement with the ground.

The operation of the undercarriage has been described in relation only to the wheels on one side thereof, but the operation of the wheels on the opposite side is identical. In practice, the two rear wheels and the two forward wheels will normally be mounted on common axles, but this is not essential and all four wheels can be independently mounted on their respective legs. In the latter case it is possible for the carriage to be drawn over an obstacle which is in the path of only the wheels on one side and the seat will remain level in the fore and aft direction although it will be tilted laterally.

The above described embodiment could be modified by connecting the upper end of the second leg to the seat by means of a pivot and using a roller, or pin, and slot connection in place of one or other of the two pivots previously described.

Since in the embodiments described above, the forward and downward inclination of both legs can render the carriage inherently unstable dependent upon the position of the centre of gravity of the carriage member, means can be provided for locking the undercarriage against pivotal movement when travelling over level ground, such means comprising, for example, a hooked catch 25 pivotally mounted on the seat and movable into and out of engagement with a pin 26 on one of the legs. Such a catch will conveniently be connected by a Bowden cable or the like to a trigger on the handle which can be operated to withdraw the catch from the pin in preparation for movement over an obstacle.

Although the embodiments of the invention described above have been related to a child's pushchair, it will be evident that the invention can similarly be applied to perambulators, stretcher carriers and numerous other type of carriage which may be moved over obstacles or uneven ground. Moreover, it will be seen from the principles described above that the invention is applicable to a carriage which has only one front and rear wheel, it being assumed that other means are provided for maintaining the lateral stability of the carriage.

I claim:
1. A wheeled carriage comprising a carriage body and, on each of two opposite sides thereof, a forward wheel, a first leg supporting said forward wheel, a first connection between said first leg and the carriage body, a rearward wheel, a second leg supporting said rearward wheel, and having an intersection with said first leg, a second connection between said second leg and the carriage body, a third connection between the first and second legs at said intersection, the three said connections constraining the forward wheel to drop relative to said body and the rear wheel to rise relative to the forward wheel while the carriage is pulled rearwardly over an upstanding obstacle with the carriage body held level in the fore and aft direction, and wherein one of said connections is a roller and slot connection and the other two said connections are pivot connections.

2. A wheeled carriage comprising
a carriage body and, on each of two opposite sides thereof,
a forward wheel,
a first leg supporting said forward wheel,
a first pivot connection between first leg and the carriage body,
a rearward wheel,
a second leg supporting said rearward wheel and having an intersection with the first leg,
a horizontally-extending roller and slot connection between the second leg and the carriage body,
a second pivot connection between the first and second legs at their intersection, the first leg being movable downwardly about said first connection relative to the carriage body as the carriage body is raised over an obstacle, the relative downward movement of the first leg causing relative downward movement of the second pivot, and relative movement between the roller and slot to swing the rearward wheel upwardly and toward the forward wheel thus maintaining both wheels in load-supporting engagement with the ground while the carriage body is maintained level in the fore and aft direction.

3. A wheeled carriage according to claim 2 wherein said first leg has a first portion extending downwardly from said first pivot connection, a second portion extending horizontally forwards from said first portion, and a third portion extending forwardly and downwardly from said second portion, and wherein said second leg has a first portion extending rearwardly and downwardly from said roller and slot connection to said second pivot connection, and a second portion extending forwardly and downwardly from said second pivot connection.

4. A wheeled carriage according to claim 3 having coupling means operable to prevent pivotal movement of said first leg about said first pivot connection.

References Cited

FOREIGN PATENTS 181,936 5/1955 Austria.
579,076 7/1958 Italy.

LEO FRIAGLIA, *Primary Examiner.*